(12) United States Patent
Kim et al.

(10) Patent No.: US 9,515,734 B2
(45) Date of Patent: Dec. 6, 2016

(54) SYSTEM AND METHOD FOR CROSS-PHASE MODULATION NOISE REDUCED TRANSMISSION IN HYBRID NETWORKS

(75) Inventors: Inwoong Kim, Allen, TX (US); Olga I. Vassilieva, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 1477 days.

(21) Appl. No.: 12/838,129

(22) Filed: Jul. 16, 2010

(65) Prior Publication Data

US 2012/0014692 A1 Jan. 19, 2012

(51) Int. Cl.
| | | |
|---|---|---|
| H04B 10/08 | (2006.01) |
| H04B 10/2557 | (2013.01) |
| H04J 14/02 | (2006.01) |
| H04B 10/61 | (2013.01) |
| H04B 10/079 | (2013.01) |

(52) U.S. Cl.
CPC ...... *H04B 10/2557* (2013.01); *H04B 10/0795* (2013.01); *H04B 10/6163* (2013.01); *H04J 14/0205* (2013.01); *H04J 14/0224* (2013.01)

(58) Field of Classification Search
None
See application file for complete search history.

(56) References Cited

U.S. PATENT DOCUMENTS

| 7,469,106 B2 * | 12/2008 | Feced et al. ............... 398/202 |
| 8,311,417 B1 * | 11/2012 | Poggiolini et al. ........... 398/208 |
| 2005/0180760 A1 * | 8/2005 | Feced et al. ............... 398/183 |
| 2006/0078337 A1 * | 4/2006 | Harley et al. .............. 398/186 |
| 2006/0159464 A1 * | 7/2006 | Cornwell et al. ............ 398/169 |
| 2006/0274861 A1 * | 12/2006 | Langenbach et al. ........ 375/341 |
| 2008/0107429 A1 * | 5/2008 | Galli et al. ............... 398/188 |
| 2008/0199182 A1 * | 8/2008 | Ooi et al. ................. 398/81 |
| 2010/0158531 A1 * | 6/2010 | Chung et al. ............... 398/79 |
| 2010/0178057 A1 * | 7/2010 | Shieh ...................... 398/79 |
| 2010/0329683 A1 * | 12/2010 | Liu ........................ 398/81 |

OTHER PUBLICATIONS

Bertran-Pardo et al: "Nonlinearity Limitations When Mixing 40-Gb/s Coherent PDM-QPSK Channels With Preexisting 10-Gb/s NRZ Channels", IEEE Photonics Technology Letters, vol. 20, No. 15, Aug. 1, 2008, pp. 1314-1316.*
A. J. Viterbi and A. M. Viterbi "Nonlinear Estimation of PSK-Modulated Carrier Phase with Application to Burst Digital Transmission", IEEE Transactions on Information Theory, vol. IT-29, No. 4, Jul. 1983.
O. Bertran-Pardo et. al., "Nonlienarity Limitations When Mixing 40-Gb/s Coherent PDM-QPSK Channels With Preexisting 10Gb/s NRZ Channels", IEEE Photonics Technology Letters, vol. 20, No. 15, Aug. 2008.
G. Goldfarb et al., "BER estimation of QPSK homodyne detection with carrier phase estimation using digital signal processing", Optics Express, vol. 14, No. 18, 2006.
G. Li, "Recent advances in coherent optical communication", Advances in Optics and Photonics 1, 279-307 (2009).

* cited by examiner

*Primary Examiner* — Li Liu
(74) *Attorney, Agent, or Firm* — Baker Botts L.L.P.

(57) ABSTRACT

In one embodiment, a method for receiving optical signals includes receiving a first set of one or more signals and a second set of one or more signals, determining a block length used to process the first set of signals, and processing the first set of signals using the block length. The first set of signals and the second set of signals are separated by a guard band. The block length is based upon the width of the guard band.

30 Claims, 5 Drawing Sheets

SYSTEM AND METHOD FOR CROSS-PHASE MODULATION NOISE REDUCED TRANSMISSION IN HYBRID NETWORKS

TECHNICAL FIELD OF THE INVENTION

The present invention relates generally to optical communication networks and, more particularly, to system and method for transmitting cross-phase modulation noise reduced signals in hybrid networks.

BACKGROUND

Telecommunications systems, cable television systems and data communication networks use optical networks to rapidly convey large amounts of information between remote points. In an optical network, information is conveyed in the form of optical signals through optical fibers. Optical fibers comprise thin strands of glass capable of communicating the signals over long distances with very low loss. Optical networks often employ wavelength division multiplexing (WDM) or dense wavelength division multiplexing (DWDM) to increase transmission capacity. In WDM and DWDM networks, a number of optical channels are carried in each fiber at disparate wavelengths, thereby increasing network capacity.

An optical signal comprised of disparate modulated signals can experience cross-phase modulation noise, a phenomenon that degrades the quality of the modulated signals. Cross-phase modulation induces phase noise on phase modulated signals in nearby channels.

SUMMARY

In one embodiment, a method for receiving optical signals includes receiving a first set of one or more signals and a second set of one or more signals, determining a block length used to process the first set of signals, and processing the first set of signals using the block length. The first set of signals and the second set of signals are separated by a guard band. The block length is based upon the width of the guard band.

In another embodiment, an apparatus for optical communication includes a receiver coupled to an optical network. The optical network transports a first set of one or more signals and a second set of one or more signals. The first and second set of signals are separated by a guard band. The receiver is configured to receive the first set of signals, determine a block length used to process the first set of signals, and process the first set of signals using the block length. The block length is based upon the width of the guard band.

In yet another embodiment, an article of manufacture includes a computer readable medium and computer-executable instructions carried on the computer readable medium. The instructions are readable by a processor, and, when read and executed, cause the processor to determine a block length used to process a first set of signals process the first set of signals using the block length. The first set of one or more signals and a second set of one or more signals are transported by an optical network. The first set of signals and the second set of signals are separated by a guard band. The block length is based upon the width of the guard band.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
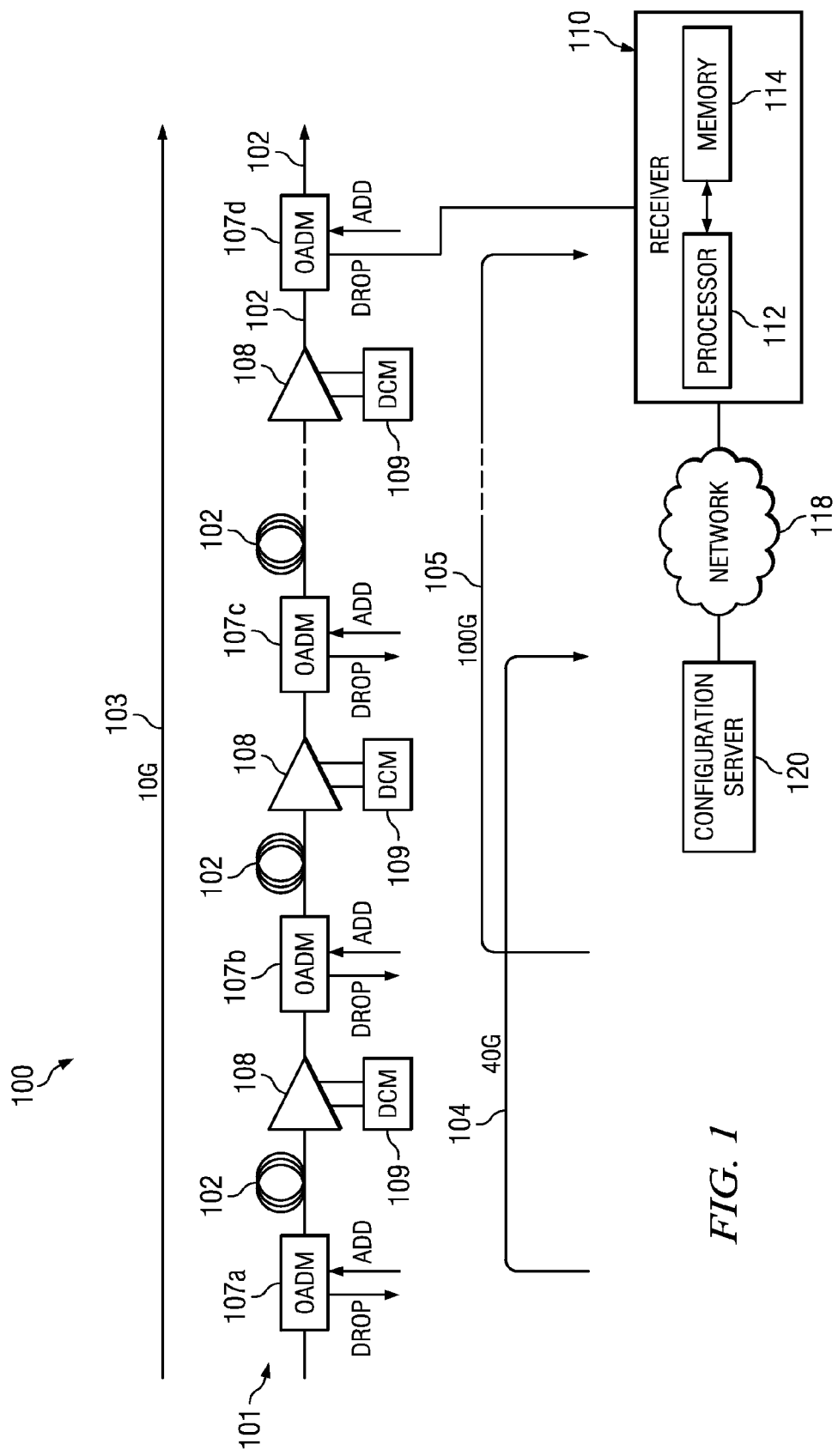
FIG. 1 illustrates an example embodiment of a system for transmitting cross-phase modulation noise reduced signals in hybrid networks.

FIG. 1 illustrates an example embodiment of a system 100 for transmitting cross-phase modulation noise reduced signals in hybrid networks. System 100 may include an optical network 101. Optical network 101 may include one or more optical fibers 102 operable to transport one or more optical signals 103, 104, 105 communicated by components of the optical network 101. The components of optical network 101, coupled together by the optical fibers 102, may include one or more optical add/drop multiplexers (OADM) 107, one or more amplifiers 108, one or more dispersion compensation modules 109, and one or more receivers 110. Optical network 101 may be a point-to-point optical network with terminal nodes, a ring optical network, a mesh optical network, or any other suitable optical network or combination of optical networks. The optical network 101 may be used in a short-haul metropolitan network, a long-haul inter-city network, or any other suitable network or combination of networks. Optical fibers 102 comprise any suitable type of fiber, such as a Single-Mode Fiber (SMF), Enhanced Large Effective Area Fiber (E-LEAF), or TrueWave® Reduced Slope (TW-RS) fiber Optical network 101 may include devices operable to transmit optical signals over optical fibers 102. Information may be transmitted and received through optical network 101 by modulation of one or more wavelengths of light to encode the information on the wavelength. In optical networking, a wavelength of light may be also referred to as a channel. OADM multiplexers 107 may include any multiplexer or combination of multiplexers or other devices operable to combine different channels into one signal. For example, OADM multiplexers 107 may comprise a wavelength selective switch (WSS). OADM multiplexers 107 may be operable to receive and combine the disparate channels transmitted across optical network 101 into an optical signal for communication along fibers 102.

Amplifier 108 may be used to amplify the multi-channeled signal. Amplifier 108 may be positioned before and/or after certain lengths of fiber 102. Amplifier 108 may comprise an optical repeater that amplifies the optical signal. This amplification may be performed without opto-electrical or electro-optical conversion. In some embodiments, amplifier 108 may comprise an optical fiber doped with a rare-earth element. When a signal passes through the fiber, external energy may be applied to excite the atoms of the doped portion of the optical fiber, which increases the intensity of the optical signal. As an example, amplifier 108 may comprise an erbium-doped fiber amplifier (EDFA). However, any other suitable amplifier 108 may be used.

The process of communicating information at multiple channels of a single optical signal may be referred to in optics as wavelength division multiplexing (WDM). Dense wavelength division multiplexing (DWDM) may refer to the multiplexing of a larger (denser) number of wavelengths, usually greater than forty, into a fiber. WDM, DWDM, or other multi-wavelength transmission techniques are employed in optical networks to increase the aggregate bandwidth per optical fiber. Without WDM or DWDM, the bandwidth in networks would be limited to the bit rate of solely one wavelength. With more bandwidth, optical networks are capable of transmitting greater amounts of information. Optical network 101 may be operable to transmit disparate channels using WDM, DWDM, or some other suitable multi-channel multiplexing technique, and to amplify the multi-channel signal.

As discussed above, the amount of information that can be transmitted over an optical network may vary directly with the number of optical channels coded with information and multiplexed into one signal. Therefore, an optical signal employing WDM may carry more information than an optical signal carrying information over solely one channel. An optical signal employing DWDM may carry even more information. Besides the number of channels carried, another factor that affects how much information can be transmitted over an optical network may be the bit rate of transmission. The greater the bit rate, the more information may be transmitted.

Improvements and upgrades in optical network capacity may involve either increasing the number of wavelengths multiplexed into one optical signal or increasing bit rates of information traveling on each wavelength. In either case, it may be more cost-efficient to use, modify, or add to existing network components than to replace the entire optical system. For reasons relating to the cost of upgrading an optical system, upgrades sometimes occur in stages in which the network must support both new technologies that provide greater bandwidth and old technologies that provide less bandwidth.

Today, many existing networks transmit information at ten gigabits per second (GB/s) and modulate the information using an on-off-keying technique (OOK). Two examples of OOK include a non-return-to-zero (NRZ) modulation technique or alternatively a return-to-zero technique (RZ). In addition, information may be transmitted at forty or one hundred GB/s using OOK. Signal transmission upgrades include, for example, transmitting using phase-shift-keying (PSK) modulation techniques. Many different kinds of PSK techniques exist, including differential-phase-shift-keying (DPSK), differential-quadrature-phase-shift-keying (DQPSK), dual-polarization-quadrature-phase-shift-keying (DP-QPSK), orthogonal-frequency-division-multiplexing-phase-shift-keying, and optical-frequency-division-multiplexing-subcarrier-multiplexing to modulate and multiplex the optical signal. Since upgrading the entire optical network's transmitters may be cost-prohibitive for most optical network operators, many such operators may upgrade their networks by incrementally replacing, for example, existing ten GB/s ("10 G") NRZ transmitters with forty or one hundred GB/s ("40 G" or "100 G") PSK transmitters.

One challenge possibly faced by those wishing to implement the cost-efficient strategy of integrating upgraded transmitters with existing transmitters is the challenge of cross phase modulation noise. Cross phase modulation may be created from the interaction between, for example, 10 G and 100 G signals, such as those shown in FIG. 1. For example, if either the 10 G and 100 G signals are transmitting a DP-QPSK signal, and the other is transmitting an OOK signal, cross-phase modulation may cause the state-of-polarization ("SOP") of the symbols which make up the transmitted signal to rotate. DP-QPSK transmission may rely upon the polarization of the symbols in order to transmit information, and thus depolarization and polarization scattering because of cross phase modulation occurs, causing crosstalk and other issues with quality. Such effects may be data dependent, and thus unpredictable, and may occur at high speeds. Thus, it may be difficult to predict the effects of cross phase modulation.

Referring back to FIG. 1, a signal transmitted in optical network 101 may include different sets of channels using different modulation formats. In particular, the WDM signal may comprise a set of channels communicating information at ten GB/s, and a set of channels communicating information at one hundred GB/s. However, the sets of disparate channels may communicate information at any suitable bit rate and/or using any suitable modulation technique. For example, one or more of the channels may communicate information at a rate of ten, twenty, forty, eighty, one hundred GB/s, or any other suitable bit rate. One or more of the channels may additionally communicate information using the modulation techniques discussed above. As used herein, a "set" of channels may include one or more channels and does not imply any spatial or any other unspecified relationship among the channels (for example, the channels in a set need not be contiguous). In addition, as used herein, "information" may include any information communicated, stored, or sorted in the network. This information may have at least one characteristic modulated to encode audio, video, textual, real-time, non-real-time and/or other suitable data. Additionally, information communicated in optical network 101 may be structured in any appropriate manner including, but not limited to, being structured as frames, packets, or an unstructured bit stream.

The multi-channel signal is transmitted over optical fibers 102 to OADMs 107. The optical fibers 102 may include, as appropriate, a single, unidirectional fiber; a single, bi-directional fiber; or a plurality of uni- or bi-directional fibers. Although this description focuses, for the sake of simplicity, on an embodiment of the optical network 101 that supports unidirectional traffic, the present invention further contemplates a bi-directional system that includes appropriately modified embodiments of the components described below to support the transmission of information in opposite directions along the optical network 101.

OADMs 107 comprise an add/drop module, which may include any device or combination of devices operable to add and/or drop optical signals from fibers 102. The add/drop module may also include any device or combination of devices operable to complete optical dispersion compensation in one or more sets of channels in an optical signal for which dispersion compensation was not completed by the associated DCM 109. Each OADM 107 may be coupled to an amplifier 108 and associated optical dispersion compensating module 109 (DCM). In addition, each OADM may be coupled to a receiver 110. Amplifiers 108 may be used to amplify the WDM signal as it travels through the optical network 101. DCMs 109 include any dispersion compensating fiber (DCF) or other dispersion compensating device operable to perform optical dispersion compensation on a signal or set of channels comprising a signal that use one modulation technique. After a signal passes through OADM 107, the signal may travel along fibers 102 directly to a destination, or the signal may be passed through one or more additional OADMs 107 before reaching a destination. As described above, amplifier 108 may be used to amplify the signal as it travels through the optical network 101, and DCM 109 may perform optical dispersion compensation on a set of channels comprising a signal that use one modulation technique. Although the optical network 101 shows DCM 109 coupled to a respective amplifier 108, the DCM 109 may also be positioned separately from amplifier 108.

Receiver 110 may be coupled to OADM 107. Receiver 110 may be configured to receive signals from optical network 102, and process the signals for the information which they contain. In one embodiment, receiver 110 may be a coherent receiver. Receiver 110 may be configured to process signals received from optical network 102 using a block length. Receiver 110 may be coupled to a configuration server 120 through network 118. Receiver 110 may include a processor 112 coupled to a memory 114.

Processor 112 may comprise, for example a microprocessor, microcontroller, digital signal processor (DSP), application specific integrated circuit (ASIC), or any other digital or analog circuitry configured to interpret and/or execute program instructions and/or process data. In some embodiments, processor 112 may interpret and/or execute program instructions and/or process data stored in memory 114. Memory 114 may be configured in part or whole as application memory, system memory, or both. Memory 114 may include any system, device, or apparatus configured to hold and/or house one or more memory modules. Each memory module may include any system, device or apparatus configured to retain program instructions and/or data for a period of time (e.g., computer-readable media).

Receiver 110 may be configured, through use of processor 112, to process signals received by receiver 110. Receiver 110 may determine which protocols, techniques, and parameters for processing techniques to use from instructions stored in memory 114. In one embodiment, receiver 110 may be configured to determine a block length to use by accessing instructions, values, or settings stored in memory 114.

Receiver 110 may be configured to determine the protocols, techniques, and parameters for processing signals received by receiver 110 by information received from configuration server 120. Configuration server 120 may be communicatively coupled to receiver 110 through network 118. Configuration server 120 may be implemented as a part of another electronic device. Configuration server 120 may be configured to access receiver 110 to inform receiver 110 of the techniques and parameters to be used to process received signals. Configuration server 120 may be configured to change such techniques and parameters on receiver 110, as well as similarly situated devices, as required for performance of the network of which receiver 110 is part. In one embodiment, configuration server 120 may be configured set the block size to be used for receiver 110, based upon the type of signals received, characteristics of the fiber or optical equipment used to transport the signals, as well as the size of any guard band used to transmit the signals.

In operation, optical network 101 may transmit information at different bit rates and/or using different modulation techniques over different channels. These different channels may be multiplexed into an optical signal and communicated over optical fiber 102. An amplifier 108 may receive the optical signal, amplifies the signal, and passes the signal over optical fiber 102. Optical fiber 102 may transport the signal to the next component. Again, amplifier 108 may be positioned separately from, either before or after, a DCM 109.

DCM 109 receives the signal and may perform optical dispersion compensation on the signal. After the DCM 109 performs optical dispersion compensation on the signal and the signal is forwarded, OADM 107 may receive the signal. After receiving the optical signal, the add/drop module of OADM 107 may drop channels from the optical signal and/or add channels to the optical signal. The OADM 107 may also complete optical dispersion compensation on the channels for which dispersion was not completed by the DCM 109. Receiver 110 may process the optical signal received from OADM 107.

Figure 2:
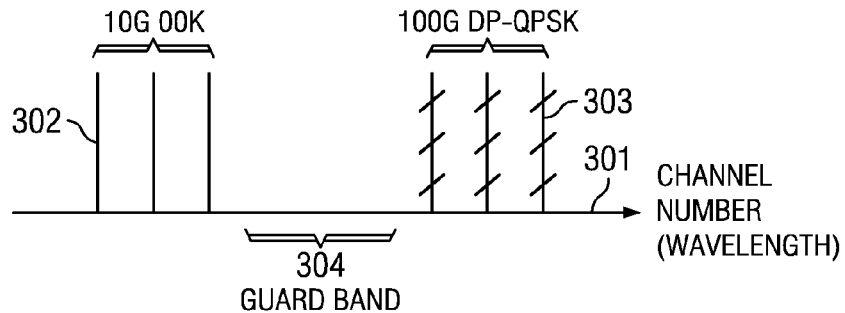
FIG. 2 illustrates an example of mapping of channel sets (wavelength assignment) to avoid cross-phase modulation noise.

One approach to addressing cross-phase modulation induced noise may involve wavelength assignment schemes. For example, each channel may be assigned particular wavelengths during transmission, and some channels may be left empty between wavelength assignments, creating a guard band. FIG. 2 illustrates an example of mapping of channel sets (wavelength assignment) to avoid cross-phase modulation noise in an arrangement by which OOK channels and DP-QPSK channels are transmitted through an optical network. 10 G OOK channels 302 and 100 G PSK channels 303 may be distributed along a wavelength spectrum 301 so as to address cross-phase modulation induced noise. A guard band 304 may be used to separate the channels transmitting the 10 G OOK channel 302 and the 100 G DP-QPSK channel 303, to counter the effects of cross-phase modulation induced noise by the OOK channel. No signals may be intentionally transmitted in the wavelengths corresponding to the guard band. The bandwidth of the guard band may vary between different implementations, but at a minimum is the necessary size to substantially reduce cross-phase modulation induced noise between multiple fiber optic signals such as the 10 G OOK channel 302 and 100 G DP-QPSK channel 303. For example, if the channel spacing in FIG. 2 is fifty gigahertz, then the guard band could be as large as 200 or 300 gigahertz. However, nothing may be transmitted on these wavelengths, meaning that the guard band wastes bandwidth which may otherwise be used for transmitting an optical signal.

Particular embodiments of the present disclosure address some of these challenges by choosing mappings of channels that minimize the effects of cross-phase modulation induced noise between OOK and other channels, as well as maximizing the available throughput.

Another method of reducing the effects of cross phase modulation induced noise is by optimizing the block size used by receiver 110 in relation to any guard band used to transmit signals in optical network 101. In one embodiment, the block size may be optimized by a carrier phase noise estimation algorithm. In such an embodiment, the carrier phase noise estimation algorithm may be performed by a digital signal processor, such as a processor 112. Processor 112 may estimate the carrier phase noise, which may be caused by randomly drifting optical frequencies of the lasers of the components of transmission devices. Processor 112 may estimate the carrier phase noise by first removing the data from an optical signal. The result should be the pure carrier signal. Processor 112 may then average the result over block size N. The averaged result may represent an estimation of the carrier phase noise, and may be removed from the carrier signal. Processor 112 may perform the carrier estimation algorithm for an optimal, or relatively optimal, value of block size $N_o$. The value of $N_o$ may vary, for example, according to the kind of fiber optic lines, modulation formats, and/or guard band used to transmit the optical signals.

Figure 3:
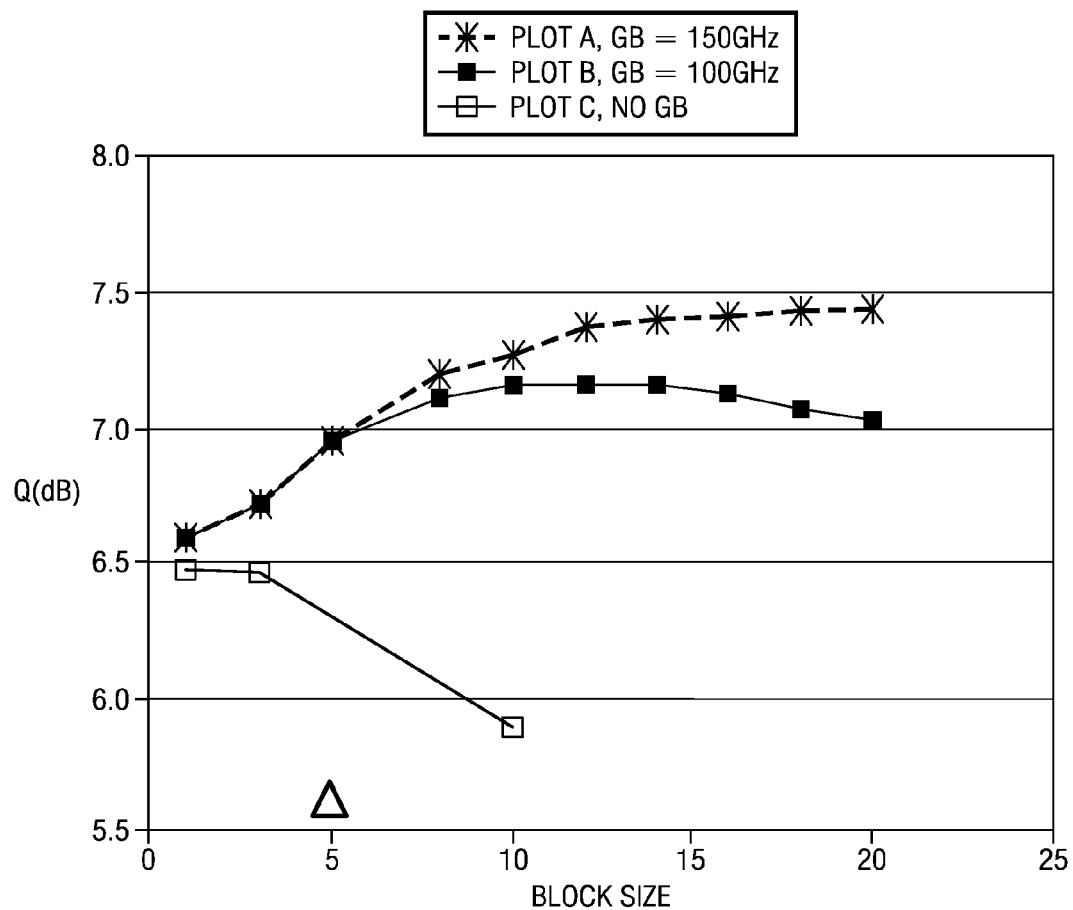
FIG. 3 is an illustration of the results of varying the guard band for a sample set of fiber optic transmission equipment and fiber type, and for several values of block length $N_o$.

Given an optimized block length $N_o$, the size of the guard band may in turn be optimized by system design. Experimentation with a given set of fiber optic transmission equipment, signal modulation format and techniques, type of fiber, dispersion maps associated with the type of fiber may determine what guard band, if any, is preferred for use in receiving optical signals. FIG. 3 is an illustration of the results of varying the guard band for a sample set of optical equipment and fiber type, and for several values of block length $N_o$. The fiber optic cable may be 720 kilometers of fiber. In one embodiment, information such as that demonstrated in FIG. 3 may be used to, given a block length, select a guard band for use in a fiber optic network. In another embodiment, information such as that in FIG. 3 may be used to, given a guard band, select a block length and determine how to program processor 112 to process received signals. In such an embodiment, the information may be used to select a block length during system design.

Any acceptable value of width for a guard band may be used, and may depend upon the particular equipment, implementation, and methods of system 100. Likewise, any acceptable value of size for block length may be used, and may depend upon the particular equipment, implementation, and methods of system 100.

FIG. 3 demonstrates the results of experimenting or simulating the effect of block size upon quality of signal ("Q-factor") received after transmission for three different guard bands. Plots A, B, and C may demonstrate the resulting quality of transmission over a length of 720 kilometers. Plot A may represent the quality of a received signal using a guard band of 150 gigahertz for a given block size. Plot B may represent the quality of a received signal using a guard band of 100 gigahertz for a given block size. Plot C may represent the quality of a received signal using no guard band for a given block size. A signal without a guard band may comprise one set of signals immediately adjacent to a second set of signals on a wavelength spectrum.

Processor 112, or another processor, computer, server, or application, may be programmed to determine, based on information such as the kind derived from FIG. 3, as only an example, an optimized block size, given a guard band. Processor 112 may apply the block size to the processing of signals received by receiver 110. For each plot in FIG. 3, it may be determined how large of a block size may be selected before the quality of the signal drops below a threshold amount.

For example, with no guard band in Plot C, it may be determined that the cross phase modulation effects are high, and thus a very small block length such as three may be the most beneficial for increasing the quality of the signal. For block sizes large than three, the quality of the signal drops signficantly. For such a plot, a lower threshold of 6.4 decibels may be selected, below which the signal quality is unacceptably poor. For a sample guard band, such as 100 megahertz in Plot B, some cross phase modulation induced noise may have been eliminated by the guard band, and thus increased block lengths may be used to bolster the quality of the transmitted signal. In such a guard band, an increased block length such as ten may be beneficial to further reduce cross-phase modulation effects, but additional increases in block length may prove to be counter-productive, reducing the quality of the received signal. For such an example, a lower threshold of quality of signal may be 7.2 decibels. For an even larger guard band, such as 150 megahertz in Plot A, cross phase modulation effects may be greatly suppressed by the presence of the large guard band. Thus, a choice of an even greater increased block length may be unencumbered by concerns of cross phase modulation effects and may contribute to an increased quality in transmitted signal.

Figure 4:
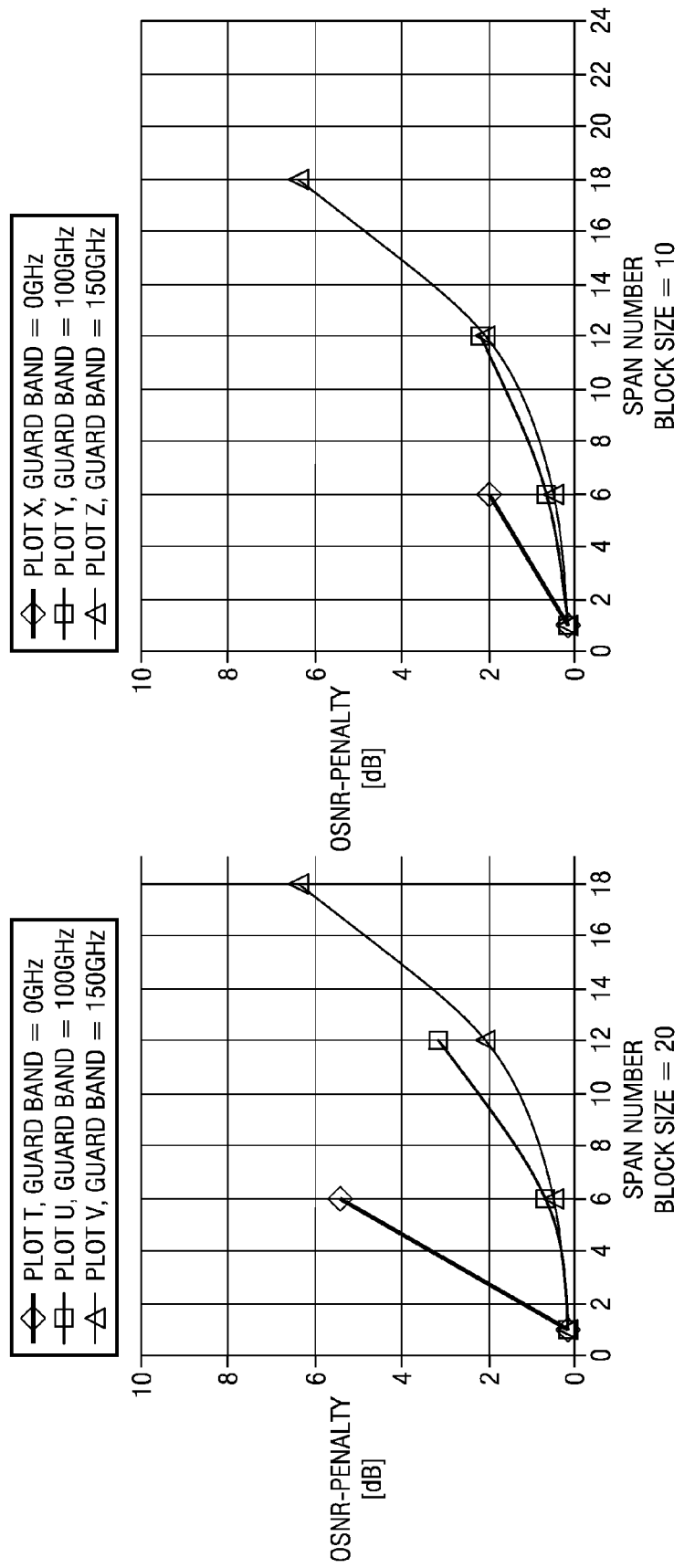
FIG. 4 demonstrates the results of experimenting or simulating the effect of span number and guard band size upon the optical signal-to-noise-ratio penalty, given a block size.

Likewise, given an optimized value of block length of $N_o$, for example, from a carrier phase noise estimation, a suitable guard band for use in optical network 101 may be determined. FIG. 4 demonstrates the results of experimenting or simulating the effect of span number and guard band size upon the optical signal-to-noise-ratio penalty, given a block size. The information in FIG. 4 may allow the determination of the smallest guard band required to maintain a signal-to-noise-ratio penalty below a particular value corresponding to a transmission standard. For example, the penalty threshold using FIG. 4 may be two decibels. While quality of signal may be important in transmitting an optical signal, some degree of signal loss may be acceptable in light, especially if an increase in block size, and thus throughput, may be gained as a trade-off. In one embodiment, all transmissions having less than a two decibel loss may be acceptable.

For example, in the chart demonstrating the results of a block size equal to twenty, at a distance of eight spans, the penalty for a signal without a guard band of Plot T is nearly six decibels, which exceeds the example limit of two. The penalty for signals with a guard band of 100 gigahertz in Plot U and 150 gigahertz in Plot V are both below two decibels. Thus, for a length of eight spans, although a guard band of 150 gigahertz may generate less noise, a guard band of 100 gigahertz may be selected as it increases the data throughput with an acceptable amount of loss. If the required distance were increased, then the noise penalty of the signal with a 100 gigahertz guard band represented in Plot U would exceed the threshold, and thus a guard band of 150 gigahertz may be selected. In such a case, the larger guard band may effectively suppress cross phase modulation induced noise.

In the chart demonstrating the results of a block size equal to ten, at a distance of 720 kilometers, the penalty for a signal without a guard band of Plot X would exceed the threshold noise limit. The penalty for signals with guard bands of 100 gigahertz in Plot Y and 150 gigahertz in Plot Z are nearly identical, and are approximately equal to the threshold noise limit. Thus, a guard band of 100 gigahertz may be selected, as it meets the noise limit and is smaller than the guard band of 150 gigahertz. In such a case, the presence of the smaller guard band, in combination with the reduced block length (in comparison to the other chart), may work in tandem to effectively suppress cross phase modulation induced noise.

FIGS. 3-4 are only examples of relationships between block size, guard band, quality of signal, and noise based upon the specified parameters. Other embodiments of the present invention may be based upon similarly discovered relationships. In one embodiment, the analysis of the relationships between block size, guard band, quality of signal, and noise based upon the specified parameters may be performed by processor 112, or by another processor, electronic device, server, or computer. In another embodiment, the results of the analysis of the relationships between block size, guard band, quality of signal, and noise based upon the specified parameters may be stored in configuration server 120, which may appropriately configure receiver 110. In one embodiment, a first set of phase shift modulated signals may include 100 G signals. In another embodiment, the first set of signals may include 40 G signals. In a further embodiment, the first set of signals may be transmitted along with a second set of signals. The second set of signals may include on-off-keying signals. In one embodiment, the second set of signals may include 10 G OOK signals. In another embodiment, the second set of signals may include 40 G OOK signals. The combination of any of these potential signals of the first and second set of signals may generate cross phase modulation induced noise. The first and second set of signals may be separated with an appropriate guard band. Given the guard band, the block length for an optical component receiving such signals may be optimized.

Figure 5:
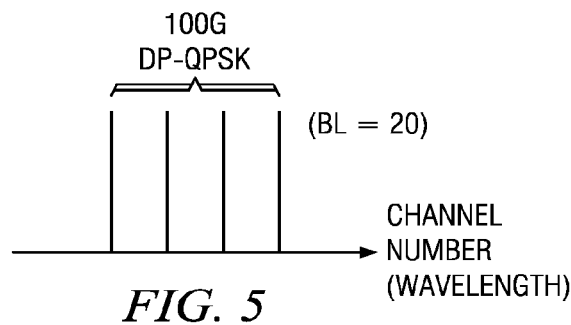
FIG. 5 is a diagram of the channel mapping and block length choice of an example embodiment wherein an entirely PSK signal is to be transmitted.

FIG. 5 is a diagram of the channel mapping and block length choice of an example embodiment wherein an entirely PSK signal is to be transmitted. For example, a 100 G DP-QPSK signal may be transmitted without an additional multiplexed signal. In such a case, cross phase modulation induced noise may be minimized, and carrier phase noise is the only dominant source of signal degradation. In such a case, the carrier phase noise may be adequately estimated with a larger block length. Thus, in such a case, no guard band and a relatively long block length, such as twenty, may be selected.

Figure 6:
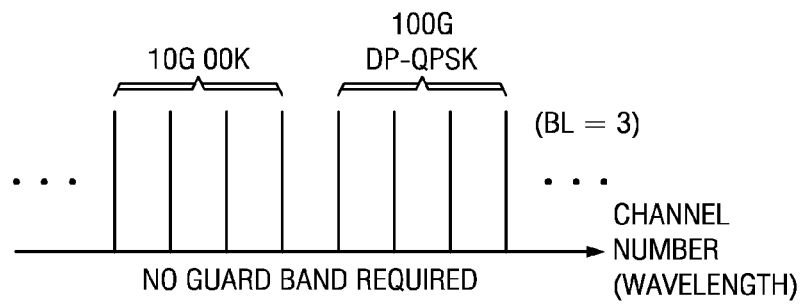
FIG. 6 is a diagram of the channel mapping and block length choice of an example embodiment wherein a small block length has been chosen.

FIG. 6 is a diagram of the channel mapping and block length choice of an example embodiment wherein a small block length has been chosen. For example, when 10 G OOK signals are adjacent to 100 G DP-QPSK signals, the 100 G DP-QPSK signals may be received with an optimized block length of three. As shown by the relatively small difference in quality of signals between Plots A, B, and C in FIG. 3, the choice of a smaller guard band may make little effective difference in the overall quality of the transmitted signal. Thus, in such a case, no guard band may be selected. In such a case, the small block length may reduce cross phase modulation.

Figure 7:
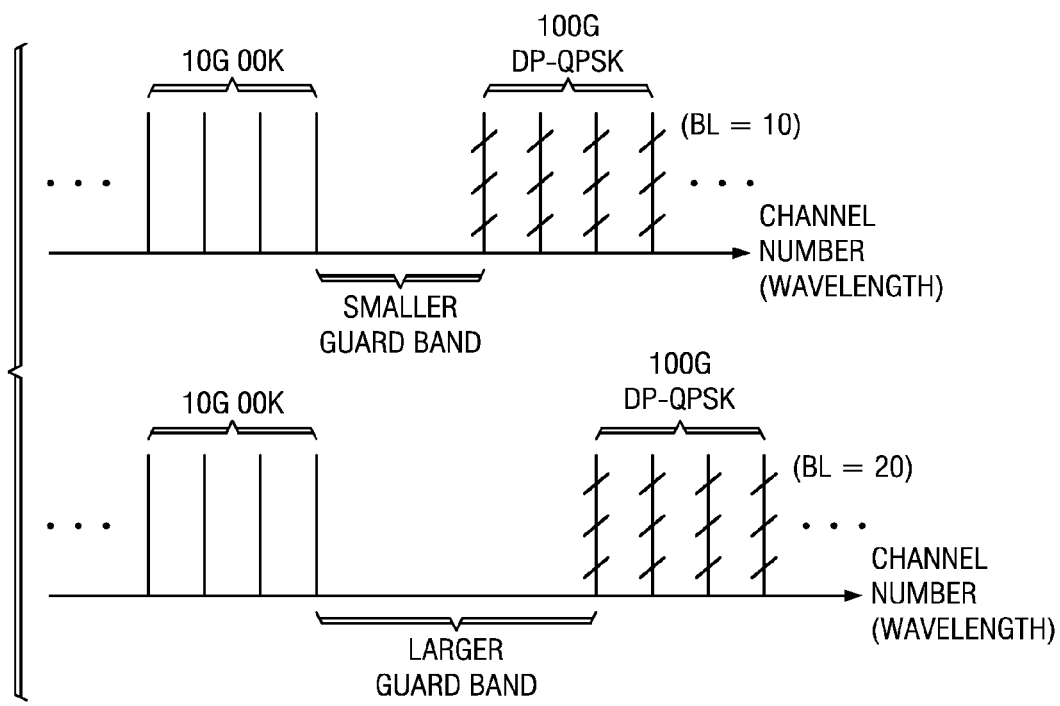
FIG. 7 is a diagram of the channel mapping and block length choice of an example embodiment wherein 10 G channels are present and a guard band is used.

FIG. 7 is a diagram of the channel mapping and block length choice of an example embodiment wherein 10 G channels are present and a guard band is used. For example, a 10 G OOK and a 100 G DP-QPSK may be transmitted together. The requirement of a smaller guard band, such as 100 gigahertz, may cause a smaller block length, such as ten, to be selected. In such a case, the introduction of the guard band may lead to a reduction in cross phase modulation induced noise, and thus the block length can be increased, or vice-versa. In another example, the requirement of a larger guard band, such as 150 gigahertz, may cause a larger block length, such as twenty, to be selected. In such a case, the larger guard band may lead to a reduction in cross phase modulation induced noise, and thus the block length can be further increased, or vice-versa.

Processor 112 may be configured with predetermined information to decide what block length should be applied to received signals. Such predetermined information, as described previously, may include modulation format, type of fiber, distance, span lengths, noise thresholds, and/or dispersion maps. Such information may be the result of previously simulating or testing the equipment of system 100. Such information may be the result of conducting the optimization processes described above. In one embodiment, the information may include a required guard band. In such an embodiment, processor 112 may select a block length based upon the required guard band.

In one embodiment, the steps of determining which guard band and block length to use in optical network 101 may be conducted fully or in part on an electronic device other than receiver 110. For example, knowing the equipment, distances, and modulation and processing techniques of the equipment of optical network 101 may allow the simulations and the subsequent choices to be made on an electronic device such as configuration server 120, or any other suitable electronic device. In one embodiment, if the requirements for the operation of optical network 101 are not expected to change, the selections of guard band and block length may be configured on receiver 110 and other optical equipment, without the ability of receiver 110 to change the values. In such an embodiment, configuration server 120 may need to resend updated selections to receiver 110.

In yet another embodiment, the guard band and block length to be used by receiver 110 and other optical equipment may be manually entered, yet derived from the optimization process described above.

FIG. 1 shows only one example of how sets of channels of different rates and modulations may be added to the signal of optical network 101. Channels and sets of channels may be added or removed in any order. Portions of optical network 101 may have one or more sets of channels representing different rates and modulations.

As noted above, although the optical network 101 is shown as a point-to-point optical network with terminal nodes, the optical network 101 may also be configured as a ring optical network, a mesh optical network, or any other suitable optical network or combination of optical networks.

Although particular components have been shown, modifications, additions, or omissions may be made to the optical network 101 without departing from the scope of the invention. The components of the optical network 101 may be integrated or separated according to particular needs. Moreover, the operations of the optical network 101 may be performed by more, fewer, or other components.

Figure 8:
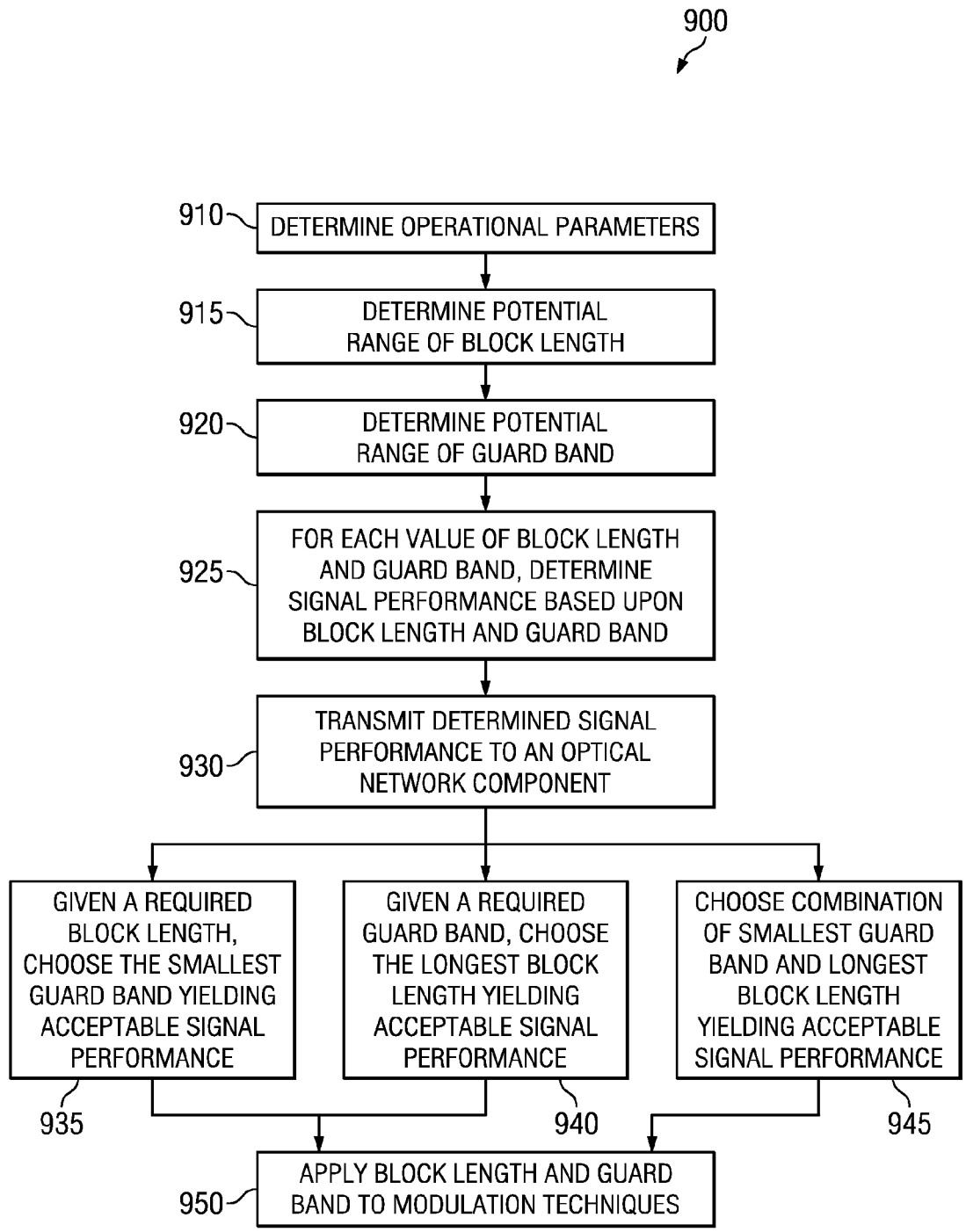
FIG. 8 is an example embodiment of a method for cross phase modulation reduced transmission in hybrid networks.

FIG. 8 is an example embodiment of a method 900 for cross phase modulation reduced transmission in hybrid networks. In step 910, operational parameters for optical equipment for use in an hybrid optical network may be determined. These parameters may include, but are not limited to, acceptable noise thresholds, number of spans between equipment, span lengths, or modulation techniques to be used. In step 915, a potential range of block lengths for use in processing techniques may be determined. The range of block lengths may be discrete and finite. The range of block lengths may depend upon the chosen operational parameters. In one embodiment, a range of block lengths from 3 to 20 may be used. Likewise, in step 920, a potential range of guard bands for use in modulation techniques may be determined. The range of guard bands may be discrete and finite. The range of guard bands may depend upon the chosen operational parameters. In one embodiment, a range of guard bands from no guard band, to 350 megahertz, in 50 megahertz increments, may be used.

In step 925, for each value of the potential ranges block length and guard band, signal performance may be determined based upon the block length and guard band. In one embodiment, step 925 may be conducted by performing experiments on optical network equipment that will carry out the steps of method 900. In another embodiment, step 925 may be conducted by performing simulations of the optical network equipment that will carry out the steps of method 900. The information obtained from either experiments or simulations may be stored in a database, server, or other entity and retrieved in step 925. In step 930, the determined signal performance may be transmitted to and received by an optical network component.

In one embodiment, one of steps 935, 940, and 945 may be selected to be performed according to the needs of the user of the method, or what parameters have been required or predetermined. In step 935, given a selected block length, the smallest guard band yielding an acceptable signal performance may be chosen, based upon the signal performance from step 925. In step 940, given a selected guard band, the longest block length yielding acceptable signal performance may be chosen, based upon the signal performance from step 925. Such a longest block length may be an optimized, or nearly optimized value, given the parameters. In step 945, a combination of the smallest guard band and the longest block length which yields an acceptable signal performance may chosen.

In step 950, the block length and guard band, whether predetermined, required, or selected, may be applied to a processing or wavelength assignment for optical network communication.

Method 900 may be implemented using the system of FIGS. 1-8, or any other system operable to implement method 900. As such, the preferred initialization point for method 900 and the order of the steps comprising method 900 may depend on the implementation chosen. In some embodiments, some steps may be optionally omitted, repeated, or combined. For example, step 930 may be conducted after a steps 935-950, wherein the chosen block length or chosen guard band are transmitted to and received by the optical network component. In another example, the ranges of steps 915 or 920 may be eliminated, and a set value for block length or guard band used instead. In yet another example, one, two, or three of steps 935, 940, or 950 may be conducted, while the other steps of 935, 940, or 945 are not performed. In certain embodiments, method 900 may be implemented partially or fully in software embodied in computer-readable media.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, and other tangible, non-transitory media; and/or any combination of the foregoing.

Although the present invention has been described with several embodiments, various changes and modifications may be suggested to one skilled in the art. It is intended that the present invention encompass such changes and modifications as fall within the scope of the appended claims.

What is claimed is:

1. A method for receiving optical signals, comprising:
   receiving a first set of one or more signals and a second set of one or more signals, wherein the first set of signals and the second set of signals are separated by a guard band;
   determining a block length used to process the first set of signals, wherein the block length is based upon the width of the guard band; and
   processing the first set of signals using the block length.

2. The method of claim 1, wherein the block length is a fixed value.

3. The method of claim 1, wherein:
   the block length comprises a value less than an upper threshold, wherein the guard band comprises a zero width.

4. The method of claim 1, wherein:
   the block length comprises the largest size for which a signal performance of the first set of signals is within a pre-defined acceptable signal quality range, given a value of the guard band and a range of acceptable values for the block length.

5. The method of claim 1, wherein:
   the guard band comprises the smallest width for which a signal performance of the first set of signals is within a pre-defined acceptable signal quality range, given a value of the block length.

6. The method of claim 1, wherein determining the block length comprises evaluating a signal performance of the first set of signals to be received as a function of the guard band and the block length.

7. The method of claim 1, wherein the first set of signals comprises a phase-shift-modulated signal, and the second set of signals comprises an on-off-keyed signal.

8. The method of claim 7, wherein the first set of signals comprises a 100 G signal, and the second set of signals comprises a 10 G signal.

9. The method of claim 7, wherein the first set of signals comprises a 40 G signal, and the second set of signals comprises a 40 G signal.

10. The method of claim 7, wherein the first set of signals comprises a 40 G signal, and the second set of signals comprises a 10 G signal.

11. An apparatus for optical communication, comprising:
    a receiver coupled to an optical network, the optical network transporting a first set of one or more signals and a second set of one or more signals, wherein the first set of signals and the second set of signals are separated by a guard band;
    the receiver configured to:
       receive the first set of signals;
       determine a block length used to process the first set of signals, wherein the block length is based upon the width of the guard band; and
       process the first set of signals using the block length.

12. The apparatus of claim 11, wherein the block length is a fixed value.

13. The apparatus of claim 11, wherein:
    the block length comprises a value less than an upper threshold, wherein the guard band comprises a zero width.

14. The apparatus of claim 11, wherein:
    the block length comprises the largest size for which a signal performance of the first set of signals is within a pre-defined acceptable signal quality range, given a value of the guard band and a range of acceptable values for the block length.

15. The apparatus of claim 11, wherein:
    configuring the receiver to determine the block length comprises configuring the receiver to access an evaluation of a signal performance of the first set of signals to be received as a function of the guard band and the block length.

16. The apparatus of claim 11, wherein the receiver comprises a coherent receiver.

17. The apparatus of claim 11, wherein the first set of signals comprises a phase-shift-modulated signal, and the second set of signals comprises an on-off-keyed signal.

18. The apparatus of claim 17, wherein the first set of signals comprises a 100 G signal, and the second set of signals comprises a 10 G signal.

19. The apparatus of claim 17, wherein the first set of signals comprises a 40 G signal, and the second set of signals comprises a 40 G signal.

20. The apparatus of claim 17, wherein the first set of signals comprises a 40 G signal, and the second set of signals comprises a 10 G signal.

21. An article of manufacture, comprising:

a computer readable medium; and computer-executable instructions carried on the computer readable medium, the instructions readable by a processor, the instructions, when read and executed, for causing the processor to:

determine a block length used to process a first set of signals; and process the first set of signals using the block length;

wherein:

the first set of one or more signals and a second set of one or more signals are transported by an optical network;

the first set of signals and the second set of signals are separated by a guard band; and the block length is based upon the width of the guard band.

22. The article of claim 21, wherein the block length is a fixed value.

23. The article of claim 21, wherein:
the block length comprises a value less than an upper threshold, wherein the guard band comprises a zero width.

24. The article of claim 21, wherein:
the block length comprises the largest size for which a signal performance of the first set of signals is within a pre-defined acceptable signal quality range, given a value of the guard band and a range of acceptable values for the block length.

25. The article of claim 21, wherein:
the guard band comprises the smallest width for which a signal performance of the first set of signals is within a pre-defined acceptable signal quality range, given a value of the block length.

26. The article of claim 21, determining the block length comprises evaluating a signal performance of the first set of signals to be received as a function of the guard band and the block length.

27. The article of claim 21, wherein the first set of signals comprises a phase-shift-modulated signal, and the second set of signals comprises an on-off-keyed signal.

28. The article of claim 27, wherein the first set of signals comprises a 100 G signal, and the second set of signals comprises a 10 G signal.

29. The article of claim 27, wherein the first set of signals comprises a 40 G signal, and the second set of signals comprises a 40 G signal.

30. The article of claim 27, wherein the first set of signals comprises a 40 G signal, and the second set of signals comprises a 10 G signal.

* * * * *